United States Patent
Emerson et al.

(10) Patent No.: US 9,941,612 B2
(45) Date of Patent: Apr. 10, 2018

(54) POWER CABLE SPLICE SLEEVE AND METHOD OF INSTALLATION

(71) Applicant: Quick Connectors, Inc., Houston, TX (US)

(72) Inventors: Tod D Emerson, Magnolia, TX (US); Jerry L Reeves, Houston, TX (US); Michael E. Daugherty, Houston, TX (US); Leroy Cantu, Manvel, TX (US)

(73) Assignee: Quick Connectors, Inc., Houston, TX (US)

( * ) Notice: Subject to any disclaimer, the term of this patent is extended or adjusted under 35 U.S.C. 154(b) by 156 days.

(21) Appl. No.: 14/415,102

(22) PCT Filed: Jun. 27, 2013

(86) PCT No.: PCT/US2013/048240
§ 371 (c)(1),
(2) Date: Jan. 15, 2015

(87) PCT Pub. No.: WO2014/004860
PCT Pub. Date: Jan. 3, 2014

(65) Prior Publication Data
US 2015/0207245 A1    Jul. 23, 2015

Related U.S. Application Data

(60) Provisional application No. 61/665,095, filed on Jun. 27, 2012.

(51) Int. Cl.
*H01R 12/70* (2011.01)
*H01R 4/70* (2006.01)
*H01R 13/622* (2006.01)

(52) U.S. Cl.
CPC ............... *H01R 12/70* (2013.01); *H01R 4/70* (2013.01); *H01R 13/622* (2013.01); *Y10T 29/49195* (2015.01)

(58) Field of Classification Search
CPC ........ H01R 12/70; H01R 4/70; H01R 13/622; H01R 4/22; H01R 4/56
See application file for complete search history.

(56) References Cited

U.S. PATENT DOCUMENTS 2,911,616 A * 11/1959 Townsend .......... H01R 13/5808
439/814
2,946,839 A * 7/1960 Horning ................... H01R 4/70
174/138 F (Continued)

*Primary Examiner* — Hoa C Nguyen
*Assistant Examiner* — Amol Patel
(74) *Attorney, Agent, or Firm* — David B. Dickinson; The Dickinson Law Offices

(57) ABSTRACT

A connector permitting the surface splicing of two electric power cables in adverse weather conditions provides a sufficient dielectric cover to prevent shorting or grounding out of the connection. A dielectric tube or sleeve having means for either a threaded or snapping connection with a cap, which is fitted over one or two electric power cables. The body after being filled with dielectric grease or silicone provides a radiused surface at each end to permit the cables to be inserted or removed quickly and efficiently. The capped end or ends can then be further weatherproofed with an additional exterior cap over the tube.

13 Claims, 1 Drawing Sheet

(56) References Cited

U.S. PATENT DOCUMENTS

| | | | | |
|---|---|---|---|---|
| 4,484,022 A | * | 11/1984 | Eilentropp | H01R 4/70 |
| | | | | 156/49 |
| 4,944,699 A | * | 7/1990 | Velke, Sr. | H01R 4/308 |
| | | | | 174/84 S |
| 5,502,280 A | * | 3/1996 | Rocci | H01R 4/70 |
| | | | | 174/84 R |
| 5,527,191 A | * | 6/1996 | Bevis | H01R 11/01 |
| | | | | 439/287 |
| 6,069,320 A | * | 5/2000 | Rocci | H01R 4/70 |
| | | | | 174/84 R |
| 2009/0163086 A1 | * | 6/2009 | Janulis | H01R 4/4818 |
| | | | | 439/787 |
| 2013/0005180 A1 | * | 1/2013 | Malloy | H01R 9/0524 |
| | | | | 439/578 |

* cited by examiner

POWER CABLE SPLICE SLEEVE AND METHOD OF INSTALLATION

FIELD OF INVENTION

This invention relates to an apparatus for installation of an electrical cable in a well, and specifically to a dielectric sleeve and cap assembly to cover a splice connector at a wellhead, which is easily installed in all weather because of its screw connection, and can be made water-resistant and reused.

BACKGROUND ART

Previously, installed electrical wiring at a wellhead was spliced together with a metallic-screwed connector that held the spliced power cables together. The connector required a sleeve fitted over the cable to insulate the high voltage and amperage power cable which could be easily installed under all working conditions. Prior sleeves were fabricated from neoprene rubber, providing the necessary electrical insulation preventing contact with the exterior cover. As long as the weather stayed warm, this previous arrangement was adequate. However, in any extreme temperature or temperature changes in a short time period, the neoprene sleeve would become brittle and difficult to handle. Installation was then problematic; any bending or movement of the wiring within the sleeve caused cracking of the neoprene sleeve and loss of its insulating efficiency. The present invention comprises an insulating sleeve that allows for rigidity, efficient installation or reinstallation in all weather, superior insulating qualities in high voltage/amperage installations, and resists cracking or leakage as it ages. An additional cap on the sleeve makes the entire boot assembly water-resistant.

SUMMARY OF THE INVENTION

A surface power cable splice sleeve provides a high-dielectric tubular body providing an internal shoulder within a tubular bore to seat an electric connector centralizing a metallic connector within the body; at least one high-dielectric interior end cap providing a hole to allow passage of an electric power cable for connection within the tubular body; and, a radiused lip on each external opening of the sleeve.

The surface power cable splice sleeve high-dielectric tubular body and the at least one high-dielectric cap are fabricated from polytetrafluoroethylene. Alternatively, the high-dielectric tubular body and the at least one high-dielectric cap can be fabricated from polyether ether ketone. The surface power cable splice sleeve can further comprise one or more exterior end caps.

A surface power cable splice can provide a boot which is composed of a high-dielectric tubular body having internal threads on at least one end of the tubular body; a shoulder within the tubular body to centrally position an electrical splice connector in a longitudinal passage in the tubular body; and, a high-dielectric threaded interior cap providing a hole to insert an electrical power cable connectable to the high-dielectric tubular body to contain the electrical splice.

Again, this surface power cable splice boot high-dielectric tubular body and the high-dielectric cap can be fabricated from either polytetrafluoroethylene or polyether ether ketone.

This surface power cable splice boot can also provide at each end of the tubular body interior threaded surfaces connectable to more than one threaded cap providing a hole for insertion of the electrical power cable and providing a shoulder to position the electrical splice connector. The surface power cable splice boot can be comprised of one or more exterior end caps.

A method of connecting a power cable splice with a dual capped dielectric connector sleeve can be accomplished by stripping an end of two electric power cables of insulation and inserting an exposed end of cable into a metallic connector; feeding a power cable through a threaded end cap; inserting said power cable through a high-dielectric tubular body which body is then screwed to the threaded end cap; stripping an end of the second of two electric power cables of insulation and inserting the exposed end of cable into a metallic connector; wrenching a hex head screw tightly to hold the spliced power cable; feeding a second power cable to be spliced to the first through a second threaded end cap; stripping second power cable of insulation and inserting exposed end of cable into the metallic connector; wrenching a hex head screw tightly to hold the second spliced power cable; lubricating the interior of the high-dielectric tubular body with silicone grease; sliding the high-dielectric tubular body over the metallic connector until the body is seated upon the distal end of the threaded end cap; and screwing the second threaded end cap into the proximal end of the high-dielectric tubular body.

This method can additional comprise the step of inserting an electrical cable inserted through an opening in each exterior cap; and, compressively sliding each exterior cap over an end of the sleeve and internal threaded cap to seal the boot or sleeve against ingress of water around the connection.

A similar method of connecting a power cable splice with a single capped dielectric connector sleeve is comprised of the steps of feeding a power cable through a threaded end cap; inserting said power cable through a high-dielectric tubular body which body is then screwed to the threaded end cap; stripping said power cable of insulation and inserting exposed end of cable into a metallic connector; wrenching a hex head screw tightly to hold spliced power cable; feeding a second power cable to be spliced to the first through the high-dielectric tubular body; stripping second power cable of insulation and inserting exposed end of cable into the metallic connector; wrenching a hex head screw tightly to hold the second spliced power cable; lubricating the interior of the high-dielectric tubular body with silicone grease; and sliding the high-dielectric tubular body over the metallic connector until the body is seated upon the interior distal end of the high-dielectric tubular body. This method can additionally comprise the steps of inserting an electrical cable through an opening in an exterior cap; and, compressively sliding said exterior cap over the sleeve and internal threaded cap.

DETAILED DESCRIPTION

Figure 1:
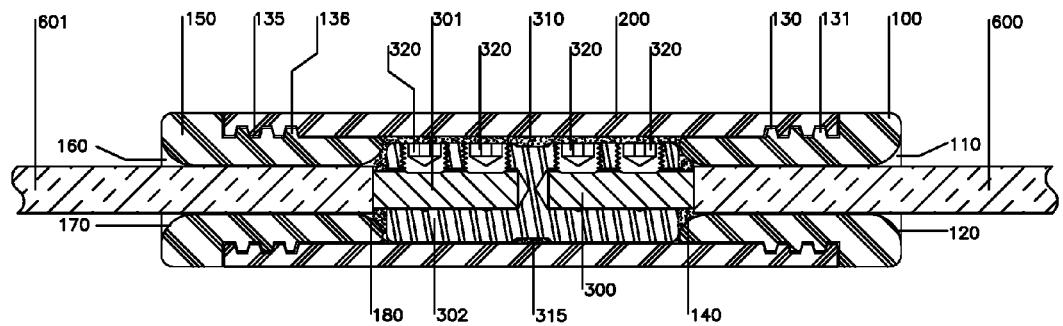
FIG. 1 is a side cross-section view of the sleeve with two end caps and a metallic connector.

In FIG. 1, an electrical power cable 600 is stripped of insulation at one end and inserted through the incurvate, flanged radial opening 110 of the threaded internal end cap 100 having a specific proximal 120 and distal 140 radii allowing the cable to be inserted into a high-dielectric tubular body or sleeve 200 at an angle which is less than perfectly axially aligned with the body 200. The body 200 is then slipped over the cable 600. The end of the power cable 600 that was stripped 300 is then inserted into the hex-head screw compressive metallic connector 302 and tightened with a wrench as is commonly practiced in the industry. The second power cable 601 which often has a thicker diameter, is stripped of insulation 301 and threaded through an opposing incurvate, flanged radial opening 160 having a similar but opposing threaded internal end cap 150 with a specific proximal and distal radii 170, 180. The second cable is then inserted into the opposing end of the wrenched metallic connector 302 and both cables are secured in the metallic connector 302 through tightening down one or more metallic hex-head screws 320 running through the body of the metallic connector 302, engaging the stripped ends 300, 301 of the opposing power cables 600, 601. After filling the cavity 310 of the high-dielectric tubular body with dielectric silicone grease 315 such as Dow Corning's D-111, the metallic connector 302 is seated inside the high-dialectic tubular body 200. The internal threaded caps 100, 150 are then attached to the tubular body 200 through internal threads 130, 131, 135 and 136.

Figure 2:
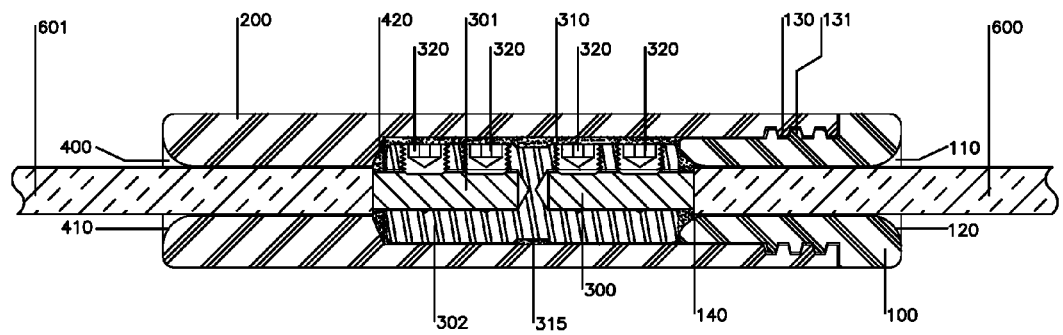
FIG. 2 is a side cross-section view of the sleeve with one end cap and a metallic connector.

In FIG. 2, an electrical power cable 600 is stripped of insulation at one end 300 and inserted through the high-dielectric tubular body 200. The cable is then inserted into one end of the metallic connector 302, and secured in the connector 302 by tightening down a metallic hex-headed screw running through the body of the metallic connector 302. A second electrical power cable 601 is also stripped of insulation 301 and inserted into the metallic connector 302 at an opposing end, and tightened in the same manner as the first cable. The electrical power cable 600 is then inserted through the incurvate, flanged opening 110 of the threaded end cap 100 having a specific proximal and distal radii, 120, 140 allowing the cable to have some lateral movement during the installation. The radii of the opening is important as it allows for differing cable to be efficiently installed through the opening in the cap, 100. The interior cavity 310, of the high-dielectric tubular body 200 is packed using dielectric silicone grease 315 such as Dow Corning's D-111, and the hex-headed screws 320 of the metallic connector 302 are then seated on an interior shoulder 420 of the high-dielectric tubular body 200. The threaded interior cap 100 is then screwed to the high-dielectric tubular body 200 using the internal threads of the high-dielectric body 130, and the interior cap threads 131. Unlike in FIG. 1, in FIG. 2 there is no need for a second threaded end interior cap, instead the cable is inserted directly through opening 400 that has a specified radius at its proximal end 410.

Figure 3:
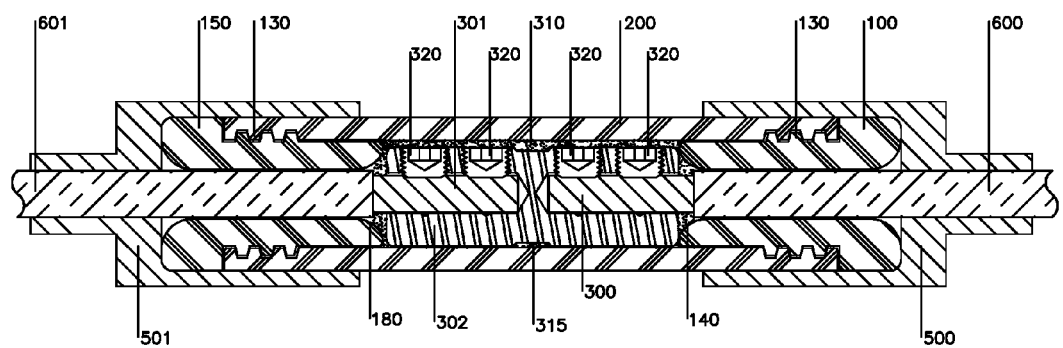
FIG. 3 is a side cross-section view of the sleeve with a water resistant exterior cap installed over each end.

FIG. 3 shows an alternate view of the high dielectric tubular body or sleeve additionally providing exterior caps 500 to seal the sleeve 200 from ingress of moisture when the sleeve is likely to be exposed to standing water. The electrical power cable 600 is threaded through the exterior caps 500, and attached by using the metallic connector 302 as shown before in FIG. 1 and FIG. 2. Then, the exterior caps 500 are compressively fitted over the end of the sleeve 200 and seal the sleeve from moisture thereby limiting the amount of seepage of standing water into the splice connection and the possibility of an electrical short.

What is claimed is:

1. A non-compressive surface power cable splice sleeve comprising:

a high-dielectric tubular body providing an internal shoulder within a tubular bore to non-compressively seat and centralize a metallic connector providing threaded openings to perpendicularly seat screws to engage an electrical conductor within the body;

at least one high-dielectric interior end cap providing a hole to allow passage of an electric power cable for connection within the tubular body;

an interior radiused lip on each external opening of the sleeve; and, a covering of silicone grease over the metallic connector.

2. The surface power cable splice sleeve of claim 1 wherein the high-dielectric tubular body and the at least one high-dielectric cap are fabricated from polytetrafluoroethylene.

3. The surface power cable splice sleeve of claim 1 wherein the high-dielectric tubular body and the at least one high-dielectric cap are fabricated from polyether ether ketone.

4. The surface power cable splice sleeve of claim 1 further comprising one or more exterior end caps.

5. A non-compressive surface power cable splice boot comprising:

a high-dielectric tubular body having internal threads on at least one end of the tubular body;

a shoulder within the tubular body to centrally and non-compressively position an electrical splice connector providing threaded openings to perpendicularly seat screws to engage an electrical conductor in a longitudinal passage in the tubular body;

a high-dielectric threaded interior cap providing a hole to insert an electrical power cable connectable to the high-dielectric tubular body to contain the electrical splice; and, a covering of silicone grease over the metallic connector.

6. The surface power cable splice boot of claim 5 wherein the high-dielectric tubular body and the high-dielectric cap are fabricated from polytetrafluoroethylene.

7. The surface power cable splice boot of claim 5 wherein the high-dielectric tubular body and the high-dielectric cap are fabricated from polyether ether ketone.

8. The surface power cable splice boot of claim 5 wherein each end of the tubular body provides interior threaded surfaces connectable to more than one threaded cap providing a hole for insertion of the electrical power cable and providing the shoulder to position the electrical splice connector.

9. The surface power cable splice boot of claim 5 further comprising one or more exterior end caps.

10. A method of connecting a power cable splice with a dual capped dielectric connector sleeve comprising:

stripping an end of two electric power cables of insulation and inserting an exposed end of cable into a metallic connector;

feeding a power cable through a threaded end cap;

inserting said power cable through a high-dielectric tubular body which body is then screwed to the threaded end cap;

stripping an end of the second of two electric power cables of insulation and inserting the exposed end of cable into a metallic connector;

wrenching a hex head screw tightly to hold the spliced power cable;

feeding a second power cable to be spliced to the first through a second threaded end cap;

stripping second power cable of insulation and inserting exposed end of cable into the metallic connector;

wrenching a hex head screw tightly to hold the second spliced power cable;
lubricating the interior of the high-dielectric tubular body with silicone grease;
sliding the high-dielectric tubular body over the metallic connector until the body is seated upon the distal end of the threaded end cap; and
screwing the second threaded end cap into the proximal end of the high-dielectric tubular body.

11. A method of claim 10 further comprising the step of inserting an electrical cable inserted through an opening in each exterior cap; and, compressively sliding each exterior cap over an end of the sleeve and an internal threaded cap.

12. A method of connecting a power cable splice with a single capped dielectric connector sleeve comprising:
feeding a power cable through a threaded end cap;
inserting said power cable through a high-dielectric tubular body which body is then screwed to the threaded end cap;
stripping said power cable of insulation and inserting exposed end of cable into a metallic connector;
wrenching a hex head screw tightly to hold spliced power cable;
feeding a second power cable to be spliced to the first through the high-dielectric tubular body;
stripping second power cable of insulation and inserting exposed end of cable into the metallic connector;
wrenching a hex head screw tightly to hold the second spliced power cable;
lubricating the interior of the high-dielectric tubular body with silicone grease; and
sliding the high-dielectric tubular body over the metallic connector until the body is seated upon the interior distal end of the high-dielectric tubular body.

13. A method of claim 12 further comprising inserting an electrical cable through an opening in an exterior cap; and, compressively sliding said exterior cap over the sleeve and internal threaded cap.

* * * * *